United States Patent Office 3,839,436
Patented Oct. 1, 1974

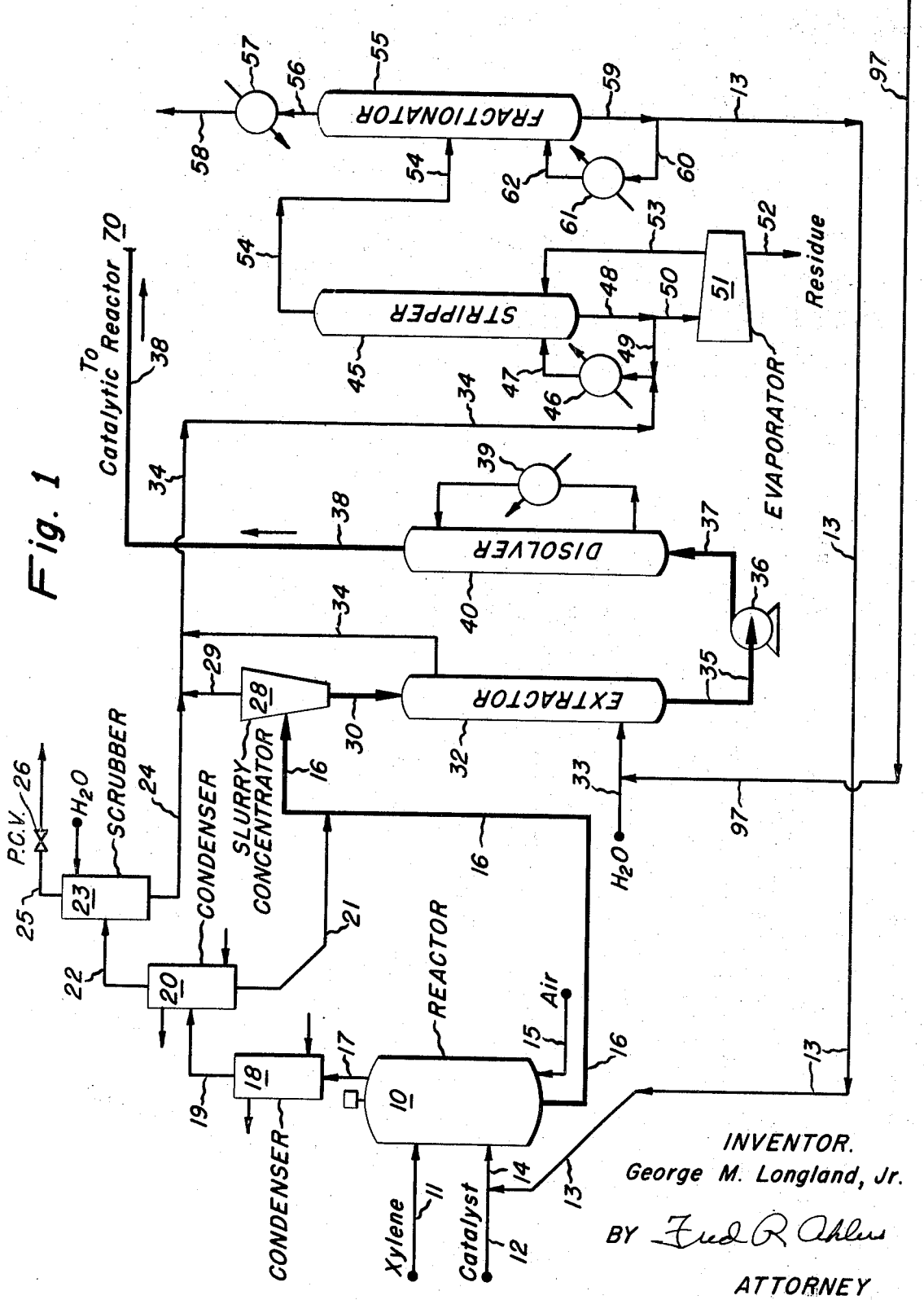

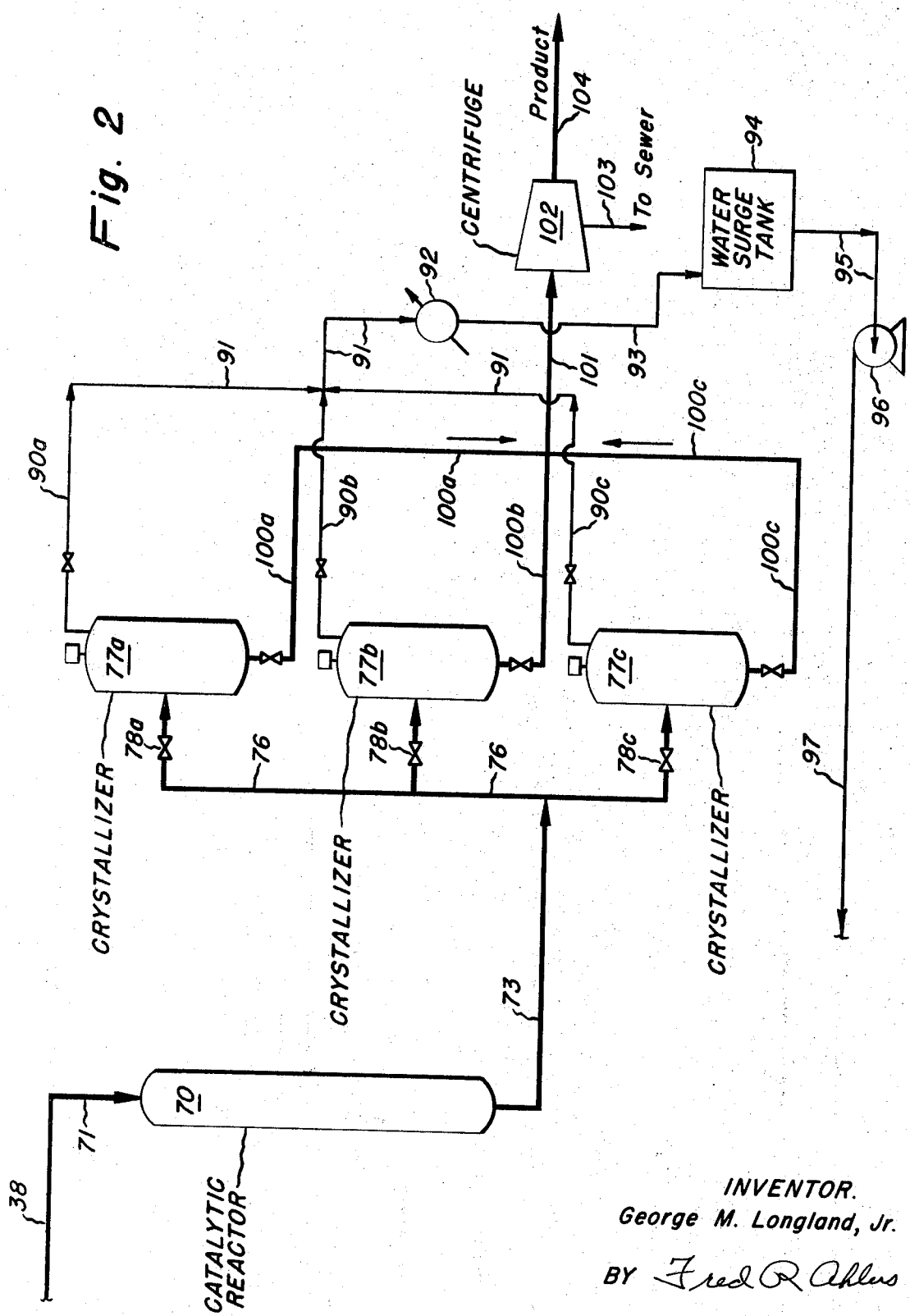

3,839,436
INTEGRATION OF PARA- OR META-XYLENE OXIDATION TO TEREPHTHALIC ACID OR ISOPHTHALIC ACID AND ITS PURIFICATION BY HYDROGEN TREATMENT OF AQUEOUS SOLUTION
George M. Longland, Jr., Highland, Ind., assignor to Standard Oil Company, Chicago, Ill.
Filed May 26, 1969, Ser. No. 827,645
Int. Cl. C07c 63/24, 63/26
U.S. Cl. 260—524 R                2 Claims

ABSTRACT OF THE DISCLOSURE

Liquid phase oxidation of p- or m-xylene with nitric acid or gas-containing molecular oxygen (e.g. air or oxygen gas) in the presence of aqueous or acetic acid reaction medium and catalysis produces fluid oxidation effluent containing tere- or iso-phthalic acid feed for product crystallization and reaction media replacement or extraction from concentrate of said effluent feed with water in a single step, preferably conducted with a vertical column of water, thereby producing aqueous acetic acid feed for recovery of acetic acid as suitable recycle to oxidation and an aqueous slurry of tere- or iso-phthalic acid as source of feed to a catalytic purification as an aqueous solution of tere- or iso-phthalic acids.

BACKGROUND OF INVENTION

Catalytic liquid phase oxidations of p- or m-xylene have been conducted with nitric acid and gas-containing molecular oxygen, such as air or oxygen gas under pressure to maintain a liquid phase of the reaction medium. Such oxidations produce fluid reaction effluents that contain tere- or iso-phthalic acid both as solute and as crystalline precipitate because those acids are only partially soluble in the reaction medium at reaction temperatures. The tere- or iso-phthalic acid product has been recovered by cooling, and, when needed, depressuring of the fluid reaction effluents to complete precipitation of acid product solute and then separating the precipitated acid from the mother liquor. The recovered product acid precipitate is impure. The impure tere- or iso-phthalic acid oxidation products are not suitable for use in the preparation of film and fiber forming polyesters, unsaturated polyesters for molding or alkyd type esters for preparing surface coating materials when light colored or white end product are desired.

Such tere- or iso-phthalic acids as obtained as impure oxidation products before described can be purified to a purity of at least 99.99% by catalytic treatment of an aqueous solution of the impure acid.

Heretofore, such oxidation, recovery of acid product and purification have all been carried out as separate, individual steps. The disadvantages or drawbacks associated therewith, especially for acid product recovery from fluid oxidation effluent, stem from the use of crystallizers and associated apparatus, filters or centrifuges and drying equipment. Also the acid product either dry or as wet filter or centrifuge cake when drying is omitted, must be slurried with water and the slurry heated to form the solution feed for purification. The present inventive integrated process eliminates such crystallization, separation of solid impure product acid and its drying and reslurrying as separate procedural steps for obtaining product acid from oxidation and supplying it in its impure form to purification.

SUMMARY OF INVENTION

The inventive integrated process in its broadest concept comprises the procedural steps of:

(a) Oxidation of p- or m-xylene under catalytic liquid phase conditions;
(b) Contacting the fluid oxidation effluent from either batchwise or continuous oxidation with liquid water preferably without cooling and depressurizing said effluent prior to contact with liquid water and preferably continuous contact with a column of water to effect precipitation of substantially all of the product acid for downward flow through the column of liquid water, removal of oxidation medium mother liquor displaced by water, e.g. as overflow above the column of liquid water, and removal of impure product acid as a slurry with a product acid content above 5, desirably at least 10 and preferably 20 to 60 parts per 100 parts of liquid water on a weight basis;
(c) Catalytic purification of the acid in aqueous solution;
(d) Separating aqueous solution from catalyst; and
(e) Recovering the product acid as a crystalline precipitate.

In step (b) of the inventive integrated process, fluid reaction effluent is contacted with liquid water. It is preferred to conduct said contacting in a vertical chamber containing a column of water because the liquid reaction medium of the fluid oxidation effluent in general has a lower density than the water at the contacting temperatures and can be taken off above the column of water and product acid crystals are of higher density than water so they fall through the column of water, collect at the bottom and can be withdrawn as a slurry in water from the bottom of the vertical chamber. A net upward flow of water in an amount of from 0 to 50 percent by weight based on the mother liquor to be displaced can be used. The major portion of water introduced near the bottom of the vertical tubular chamber after establishing the column of water, 70 to 85% of the height of the chamber, furnishes water for the removed slurry. The fluid oxidation effluent entering the top portion of the vertical tubular chamber will be at a temperature in the range of 100 to 275° C. As before pointed out the solubility of tere- and iso-phthalic acid products have rather low solubilities in water below 180° C. to 150° C., respectively. Accordingly, fluid oxidation effluent is contacted with liquid water at a temperature suitably in the range of 50 up to 150 to 180° C. depending on the phthalic acid product in the effluent and the temperature at which the effluent is produced. Most of the product acid in the fluid oxidation effluent, for economic efficiency, is recovered in the withdrawn slurry.

To aid in the recovery of product acid in the slurry withdrawn from contact with liquid water, the fluid oxidation effluent can be concentrated for example in a fluid hydroclone, a cyclone separator or by settling. Then the concentrate is introduced into the vertical chamber containing the column of liquid water. For such concentration of fluid oxidation effluent it is preferred to use a liquid cyclone which can be one or more large liquid cyclones operated in parallel or series or can be a plurality, 10 to 100 or more, small (e.g. 5 to 30 mm.) parallel operated liquid cyclones having their feed inlets, overflow outlets and underflow concentrate outlets connected to common feed, overflow discharge and concentrate underflow discharge manifolds. The fluid oxidation effluent can be partially cooled, for example by oxidation by-product water condensate before or after being concentrated.

The fluid oxidation effluent, as before indicated, can be obtained by liquid phase oxidation of p- or m-xylene with molecular oxygen or nitric acid as the oxidant. Oxidations using molecular oxygen (e.g. oxygen gas or air) are conducted in the presence of acetic acid reaction medium.

To aid in the further understanding of the present inventive integrated process, a specific embodiment thereof is described in detail hereafter with particular reference to the accompanying process flow sheet type drawings.

THE DRAWINGS

FIG. 1 is a schematic process flow sheet drawing illustrating use of the oxidation step to convert p-xylene with air in the presence of acetic acid and catalyst to fluid oxidation effluent containing suspended solid and dissolved terephthalic acid, the concentration of that oxidation effluent, displacement extraction of acetic acid from oxidation effluent concentrate with water, formation of aqueous solution of terephthalic acid from aqueous slurry of terephthalic acid withdrawn from extraction, and processing of displaced acetic acid for recycle to the oxidation step.

FIG. 2 is a schematic process flow sheet drawing illustrating use of catalytic treatment of aqueous solution of terephthalic acid formed from aqueous slurry withdrawn from acetic acid displacement step in FIG. 1.

For convenience of following terephthalic acid from its formation by p-xylene oxidation through the subsequent integrated cooperating steps to recovery of purified terephthalic acid product, those flow streams containing terephthalic acid are shown in both of FIGS. 1 and 2 in extra heavy weight lines.

EXAMPLE 1

With reference to FIG. 1, there is conducted the continuous oxidation of p-xylene with air in the presence of acetic acid and catalysis.

Fluid oxidation zone effluent is withdrawn from oxidation reactor 10 through liquid effluent discharge conduit 16. Fluid oxidation effluent from discharge conduit 16 and condensate from reactor condenser 20 are charged as shown to slurry concentrator 28 for example by combining those two streams before they enter slurry concentrator 28 to effect quenching of fluid oxidation effluent or fluid oxidation effluent in discharge conduit 16 can be directly fed to slurry concentrator 28 and aqueous condensate from transfer conduit 21 added to slurry concentrate. Slurry concentrator 28 is shown as a liquid cyclone but can be any means for effecting concentration of the quenched fluid oxidation effluent under pressure such as a centrifugal classifier or classification column. The fluid oxidation effluent is concentrated by slurry concentrator 28 by removal of therefrom of about 289 pounds of acetic acid mother liquor per hour through overflow conduit 29. Slurry concentrate is discharged through underflow conduit 30. The quenched slurry concentrate flows into the top of extraction tower 32 filled to about 85% of the volume of the tower into the lower portion of which is charged water at 40° C. at the rate of 557 pounds per hour through water charge conduit 33. About 234 pounds per hour of acetic acid mother liquor together with a net water diluent upflow of about 47 pounds per hour are discharged through tower overflow conduit 34. Terephthalic acid dissolved in acetic acid mother liquor of the slurry concentrate precipitates as crystals together with undissolved terephthalic acid in the slurry concentrate and the total terephthalic acid, about 153 pounds per hour drops down through the column of water moving slowly upward in crystallization-extraction tower 32 and is withdrawn as a slurry of 30 parts solids per 100 parts of water through slurry discharge conduit 35 by slurry pump 36 which discharges the slurry of terephthalic acid through slurry transfer conduit 37 to dissolver 40 in which an aqueous solution of terephthalic acid is formed (30 pounds of solute per 100 pounds of water) as a feed source for terephthalic acid purification by catalytic treatment in catalytic reactor 70 (FIG. 2) which receives said solution via line 38.

The aqueous solution from the bottom of catalytic reactor 70 flows into discharge conduit 73 and manifold 76 to supply charge solution for each of stirred crystallizers 77a, b and c by selective operation of valves 78a, 78b and 78c wherein terephthalic acid crystalline product can be precipitated from solution either continuously or batchwise. Crystal product precipitation can be aided by evaporation of solvent water as shown, in FIG. 2 wherein water vapor is removed via valved vapor conduits 90a, 90b and 90c to vapor manifold 91 and condensed by cooler 92. The water condensate may be collected and reused, if desired, as water feed to extractor 32, by condensate conduit 93, water surge tank 94, its discharge conduit 95, recycle pump 96 and water recycle conduit 97.

What is claimed is:

1. An integrated process for converting p-xylene or m-xylene to terephthalic acid or isophthalic acid product having a purity of at least 99.95 weight percent which comprises:

(a) oxidation of p-xylene or m-xylene in an oxidation zone with oxygen-containing gas under liquid phase conditions in the presence of acetic acid as reaction medium and catalysis and removal of oxidation effluent containing a slurry of iso- or terephthalic acid in liquid acetic acid from the oxidation zone;

(b) concentrating said fluid oxidation zone effluent slurry through the removal of acetic acid by centrifugal classification to a slurry having a solids content of 25 to 40% by weight;

(c) contacting said slurry concentrate in a displacement zone with liquid water introduced into near the bottom of the displacement zone at a temperature in the range of 40 to 100° C. and in an upward moving amount equal to 0 to 50 percent of the acetic acid mother liquor content of said concentrate and 100 weight parts of water for each 10 to 50 weight parts of phthalic acid present in said concentrate and removing displaced acetic acid mother liquor as an overflow stream from the top of the displacement zone water and slurry of 10 to 50 weight parts of impure iso- or terephthalic acid in 100 weight parts of water from the bottom of the displacement zone;

(d) purifying said withdrawn slurry catalytically in aqueous solution; and (e) recovering crystalline acid product as a precipitate from said catalytically treated solution.

2. The process of Claim 1 wherein the displacement zone of step (c) comprises a column of water.

References Cited

UNITED STATES PATENTS

| | | | |
|---|---|---|---|
| T861,029 | 4/1969 | Kirby | 260—524 |
| 3,072,717 | 1/1963 | Pritchett et al. | 260—524 |

FOREIGN PATENTS

| | | | |
|---|---|---|---|
| 726,213 | 1/1966 | Canada | 260—525 |

OTHER REFERENCES

Tipson: "Crystallization and Recrystallization" in Weissberger (ed.), "Technique of Organic Chemistry, Volume III," 1950, pp. 410–11.

Tipson: "Crystallization and Recrystallization" in Weissberger (ed.), "Separation and Purification," 1956, pp. 470–3.

Skau et al.: article in "Physical Methods of Org. Chem.," Weissberger, ed., 1959, pp. 347–9.

LORRAINE A. WEINBERGER, Primary Examiner

R. D. KELLY, Assistant Examiner

U.S. Cl. X.R.

260—524 N, 525